July 9, 1957 K. R. ODERMATT 2,798,458
PET COLLAR
Filed Aug. 2, 1956
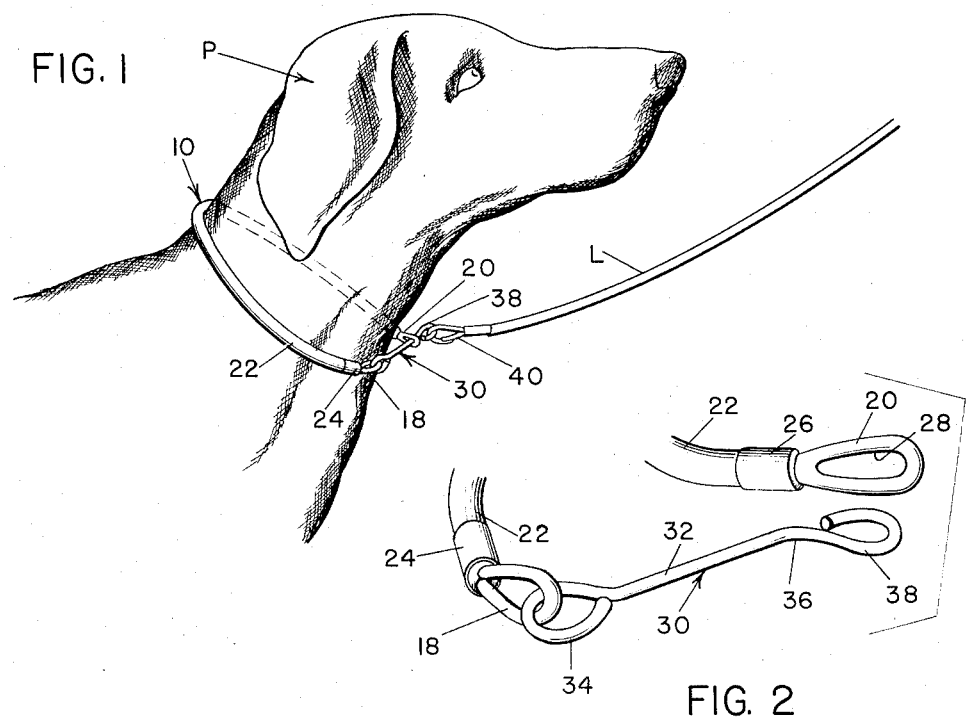
FIG. 1
FIG. 2
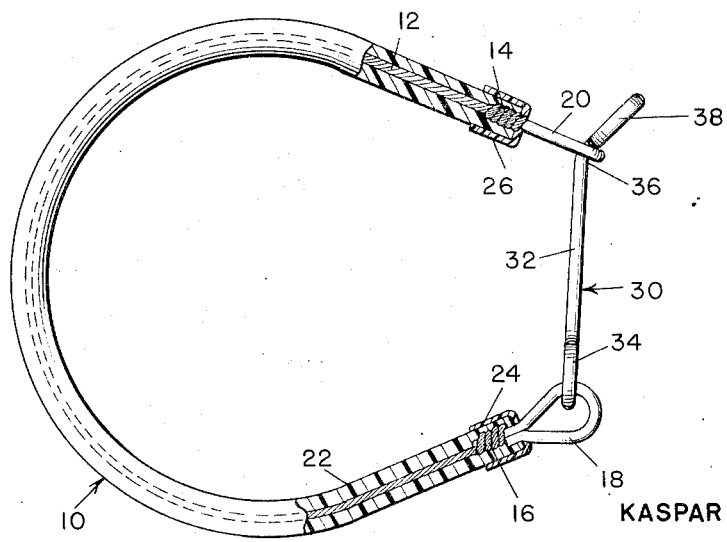
FIG. 3
KASPAR R. ODERMATT
INVENTOR
BY Samuel M. Meerkreebs
ATTORNEY United States Patent Office 2,798,458
Patented July 9, 1957

2,798,458
PET COLLAR

Kasper R. Odermatt, Fort St. John,
British Columbia, Canada

Application August 2, 1956, Serial No. 601,790

3 Claims. (Cl. 119—106)

This invention relates to new and useful improvements in pet collars usable for dogs, cats or the like.

A primary object of invention is to provide a novel pet collar which is relatively strong, causes a minimum of irritation to the pet upon which it is disposed, and which includes means for readily attaching and detaching the same on a pet with a minimum amount of effort.

A further object of invention in conformance with that set forth is to provide a novel pet collar including a central flexible core member terminating in loop end portions, one of which being substantially elongated and having a narrow slot portion therethrough, an elongated link element secured at one end to the other loop end portion of the core member, the other end portion of the link element having a transverse loop end portion extendable through the narrow slot portion of the core member wherein the collar may be detachably disposed about the neck of a pet.

A further object of invention in conformance with that set forth resides in providing a covering material about the core member of the novel pet collar of the character involved wherein said cover is of a luminescent paint facilitating the location of a pet.

And yet another object of invention in conformance with that set forth is to provide a novel pet collar which is readily and economically manufactured, easily used and highly satisfactory and acceptable for the purpose intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the novel pet collar disposed on a dog;

Figure 2 is an enlarged fragmentary perspective view showing the terminal end portions of the core member of the pet collar and the link element secured to one of the ends thereof prior to the link element being secured into the other end of the core member of the collar; and Figure 3 is a side elevational view of the novel pet collar as it would appear when secured about the neck of a pet, portions broken away and shown in section for clarity.

Indicated generally at P is a pet which has circumposed about its neck the novel pet collar indicated generally at 10.

The novel pet collar includes a central core member 12 which is of any suitable material, a flexible wire cable, for example, said cable being secured at its opposite ends 14 and 16 to loop end portions 18 and 20, respectively. Circumposed about the flexible cable 12 is a suitable covering material 22 which may be of plastic or the like, said covering material, if desired, having an outer coating of a luminescent or phosphorescent paint for the purpose of facilitating the location of the pet in the dark, for example. Suitable cap or thimble elements 24 and 26 are circumposed about the ends of the covering member 22, and the loop end portions 18 and 20, respectively, extend through said thimble elements. It will be noted that the loop end portion 20 is substantially elongated having a narrow slot portion 28 therethrough which facilitates the securing of the end portions of the collar together to form the collar as will subsequently become apparent.

An elongated link element is indicated generally at 30, said link element also being as a connecting element, if desired, said link element including a central or elongated body portion 32 having at one end a loop end portion 34 extendable through the loop end portion 18 of the core member, the other end portion of the body member 32 being angularly directed away from said body member as seen at 36 and terminating in a transverse loop end portion 38.

The loop end portion 38 of the link element 30 will be twisted and extend through the narrow slot portion 28 previously described, whereafter the loop end portion 38 of the connecting link element will be disposed transversely relative to said narrow slot portion, see Figure 3, this preventing the end portions of the collar from separating, thus retaining the novel pet collar about the neck of the pet P. The loop end portion 38 facilitates the connection thereto of a snap fastener 40 of a conventional dog leash L.

Thus there has been disclosed a novel pet collar which fully conforms with the objects of invention heretofore set forth.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A pet collar comprising an elongated flexible core member terminating in loop end portions, one of said loop end portions being elongated having a narrow slot portion therethrough, an elongated link element including at one end a loop end portion extending through the other loop end portion of the core member, the other end portion of the link element including a loop end portion disposed in angular transverse relationship to the longitudinal axis of the link element and being removably received in the narrow slot portion in the loop end portion of the core member forming a collar and providing securing means connectable to a connecting portion of a pet leash.

2. In a pet collar as set forth in claim 1 including a tubular protective cover member circumposed about the core member and terminating adjacent the loop end portions thereof.

3. In a pet collar as set forth in claim 2 wherein the protective covering member is coated with a luminescent coating material facilitating the location of a pet upon which the collar is disposed.

References Cited in the file of this patent

UNITED STATES PATENTS 2,196,627    DeSanctis _____ Apr. 9, 1940

FOREIGN PATENTS 624,625    Great Britain _____ June 14, 1949